United States Patent [19]

Noland

[11] 4,218,607
[45] Aug. 19, 1980

[54] WATER CIRCULATING DEVICE FOR AN ANIMAL WATERING APPARATUS

[76] Inventor: Wayne B. Noland, 340 Cresent Dr., Carlisle, Iowa 50047

[21] Appl. No.: 903,568

[22] Filed: May 8, 1978

[51] Int. Cl.$^2$ .................. F22H 1/12; A01K 7/06; F16L 53/00

[52] U.S. Cl. ..................... 219/301; 119/73; 137/301; 137/341; 138/32; 138/33; 138/113; 138/116; 219/299; 219/341; 222/146 HE; 237/80

[58] Field of Search ............... 219/296–299, 219/301, 341, 535; 137/301, 341, 59; 138/32, 33, 34, 35, 115, 116, 113, 27, 28; 119/73, 75; 222/146 R, 146 H, 146 HE; 237/80

[56] References Cited

U.S. PATENT DOCUMENTS

| | | | |
|---|---|---|---|
| 2,062,246 | 11/1936 | Atkinson | 138/32 |
| 2,351,544 | 6/1944 | Revard | 138/32 |
| 2,932,313 | 4/1960 | Noland | 137/301 X |
| 3,784,785 | 1/1974 | Noland | 219/301 |
| 3,932,727 | 1/1976 | True | 219/301 |
| 3,949,707 | 4/1976 | Armstrong et al. | 219/301 X |
| 4,069,409 | 1/1978 | Noland et al. | 219/301 |
| 4,091,261 | 5/1978 | Noland | 219/301 |

Primary Examiner—A. Bartis

Attorney, Agent, or Firm—Henderson & Sturm

[57] ABSTRACT

An animal watering apparatus has an exterior housing with a water pipe disposed therein leading from a below ground source of water under pressure to an above ground outlet valve mechanism which can be actuated by an animal to release water directly into the animal's mouth. A longitudinally extending electric heating element disposed within the housing in immediate heat exchange relationship with one side of the water pipe continually supplies heat to the pipe to prevent freezing of the water therein. Thermal insulation surrounds the heating element and pipe. A circuitous passageway, provided within the heated portion of the pipe by means of an open-ended tubular member disposed therein, causes continuous water circulation in the pipe for preventing build-up of heat at the water outlet valve of the watering device. The tubular member includes a pair of external longitudinal ribs in sealing contact with the interior of the water pipe adjacent to the heating element for forming a convection flow passageway between the interior surface of the pipe and the exterior surface of the tubular member, whereby the hotter water in the pipe rises through the passageway and the cooler water falls through the tubular member to establish the continuous circulation.

1 Claim, 4 Drawing Figures

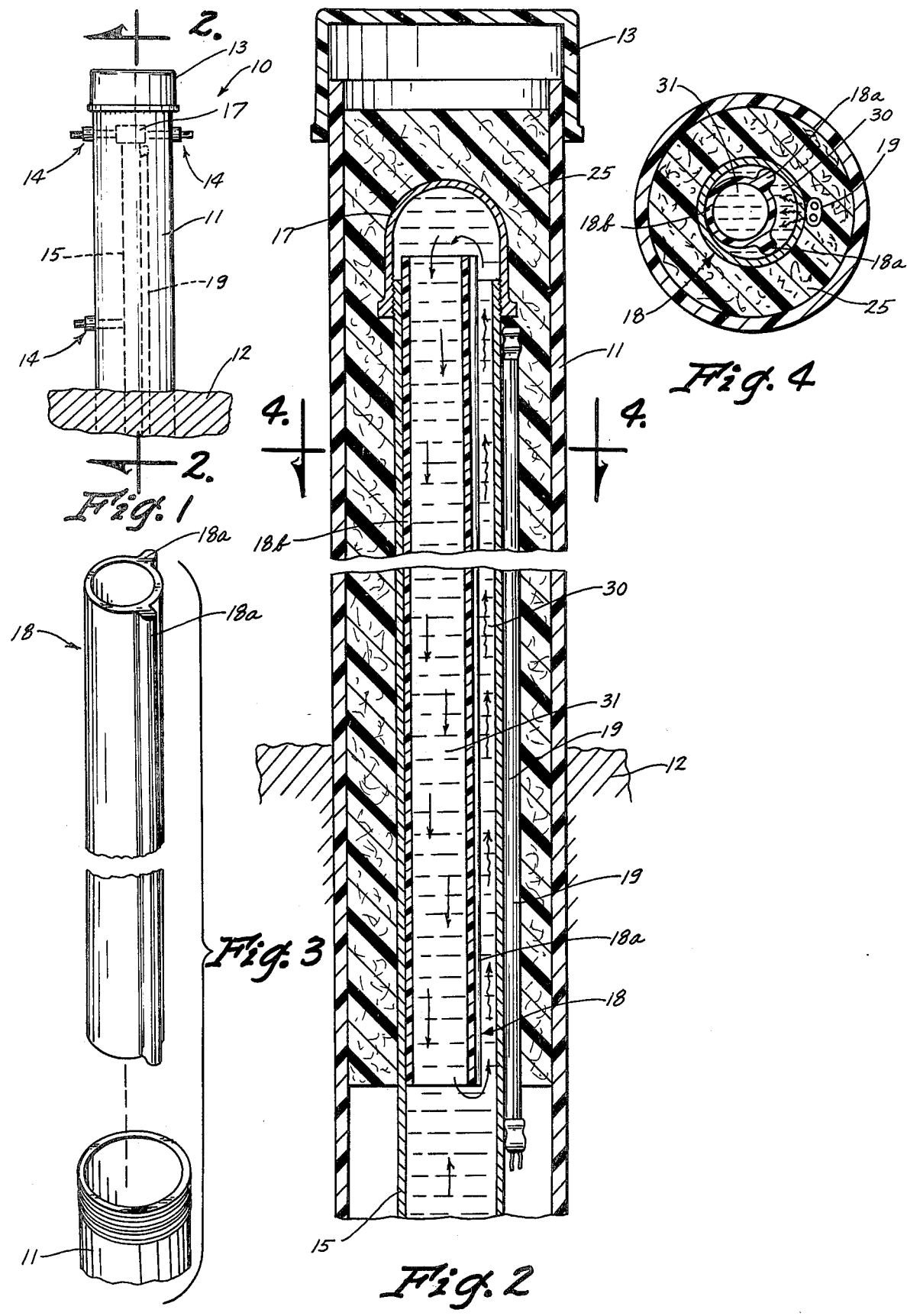

WATER CIRCULATING DEVICE FOR AN ANIMAL WATERING APPARATUS

BACKGROUND OF THE INVENTION

The present invention relates generally to animal watering devices and more particularly to a means for preventing such animal watering devices from freezing in cold weather.

Automatic watering devices for allowing animals to drink therefrom whenever desired have been in use for many years. One of the traditional problems with the use of such devices has been to keep them from freezing in cold weather. This problem has, of course, been solved in many ways, but many of these solutions are unacceptable because too much energy is required in order to keep such devices working properly. Various thermostatically controlled electrical heating elements have been used, but whenever a thermostat is added to the circuitry, this involves an additional expense for such an element and also tends to decrease the reliability because of the possible failure of such thermostatic element. Accordingly, it has been determined that the use of a very low wattage heating element which runs continuously can in some cases be far more economical and more reliable than many designs which use thermostatically controlled heating elements. One design for such a watering device using a low wattage heating element on a continuous basis in cold weather is disclosed in U.S. Pat. No. 4,069,409 to Noland.

It has been determined, however, that there is one disadvantage of such a watering device having a heating element continually supplying heat to an insulated housing, and that is that if there are not enough animals to continuously use the waterer, it is possible that there can be a buildup of heat around the nipple valve from which the animals drink, thereby causing the water to be so warm that the animals are reluctant to drink therefrom.

One solution to this problem has been to reduce the amount of heat applied to the waterer, but it has been found that in certain cases other parts of the watering device may freeze unless a certain minimum amount of heat is supplied. Therefore, there is a need for a way to distribute the heat supplied so that a buildup of heat does not occur at the nipple valve.

SUMMARY OF THE INVENTION

The present invention relates to an animal watering apparatus having a water supply pipe leading from the source of water under pressure to a valve mechanism for supplying animals with water. A heating element is disposed adjacent to one side of the water supply pipe. This entire assembly is disposed in a casing which is then filled with insulation material such as urethane foam surrounding the water supply pipe and heating element. An open-ended tubular structure having a pair of ribs thereon is disposed within the water supply pipe for allowing circulation of water within the water supply pipe. The ribs are in sealing contact with the interior portion of the water supply pipe adjacent to the heating element so that a heated water passageway is formed. The water in the passageway is hotter than the water within the tubular member so that water rises within the passageway and falls in the tubular member creating a circuitous flow which prevents the concentration of heat in the water supply pipe near the heating element.

An object of the present invention is to provide an improved animal watering device.

Another object of the invention is to provide an economical mechanism for keeping animal watering devices from freezing in cold weather.

A further object of the invention is to provide a simple and yet low cost structure for preventing heat from building up at the water outlet of an animal watering device.

Still another object of the invention is to provide a structure for circulating water within an animal watering device without the use of expensive pumping structures.

Other objects, advantages and novel features of the present invention will become apparent from the following detailed description of the invention when considered in conjunction with the accompanying drawings.

BRIEF DESCRIPTION OF THE DRAWINGS

FIG. 1 is a side elevational view of an animal watering device constructed in accordance with the present invention;

FIG. 2 is an enlarged cross-sectional view taken along line 2—2 of FIG. 1;

FIG. 3 is an exploded perspective view of an important portion of the animal watering apparatus of FIGS. 1 and 2; and FIG. 4 is an enlarged cross-sectional view taken along line 4—4 of FIG. 2.

DESCRIPTION OF THE PREFERRED EMBODIMENT

Referring now specifically to the drawings wherein like reference numerals designate identical or corresponding parts throughout the several views, FIG. 1 shows a watering device 10 constructed in accordance with the present invention. In FIG. 1, a casing 11 is vertically disposed and extends upwardly from a concrete footing 12 used to install this animal watering device 10. A cap 13 is positioned on top of the casing 11 for the purpose of retaining heat within the casing 11 and also making the watering device substantially water tight and shielding it from the elements. A plurality of nipple valves 14 extend from the casing 11 for allowing animals such as hogs to drink therefrom as is well known in this art.

Referring now to FIG. 2 which show the parts of this invention with more particularity, it can be seen that there is a water supply pipe 15 for connection to a water supply line (not shown) which is normally below the freeze line for the particular geographic location where the device is to be installed. This water supply pipe 15 extends upwardly and has at least one water connection extending therefrom to which at least one nipple valve 14 is attached. Referring back to FIG. 1, it can be seen that there are three nipple valves 14 attached to the water supply pipe 15 but any number desired can be used.

The top of the water supply line 15 is externally threaded and is attached to a coupling member 17 which, in turn, is connected to the nipple valve 14. These nipple valves 14 are normally threadedly attached to the member 17 or to a coupling element which is connected to the element 17, and it is to be understood that a plug can be inserted instead of a nipple valve 14 if it is desired to close off one of the openings and not use it. A plastic polyvinyl-chloride baffle member 18 is disposed within the pipe is and is shown in FIG. 2, 3 and 4. The baffle member 18 is generally tubular in shape and includes a pair of longitudinally extending externally ribs 18a extending along the length thereof. The width from the extremity of one rib 18a to the extremity of the other rib 18a is slightly wider than the internal cross-sectional diameter of the pipe 15, as shown in FIG. 4 so that when it is inserted into the pipe 15, it will remain in place despite external and internal forces such as water pressure. It is important to note the orientation of the baffle member 18 with respect to the heating element 19. The ribs 18a are forced tightly against the interior of the inlet pipe 15 and the back portion 18b of the member 18 is forced against the other side of the interior of the pipe 15 due to the size and resiliency of the member 18. Consequently, circulating chambers 30 and 31 are formed, chamber 30 being formed between the pipe 15, ribs 18a and a portion of the tubular portion of member 18, and chamber 31 being formed by the hollow interior portion of the member 18.

The heating element 19 passes in very close proximity if not in contact with the water supply pipe 15 for the purpose of transmitting heat from the heating element 19 to the water supply pipe 15 and to the water therein. The outer casing 11 emcompasses all of the elements aforementioned and also is filled with an insulating material such as high efficiency urethane foam 25 to allow the device to retain the heat generated and not to lose this heat to the outside air. A power supply cord (not shown) extends up through to the heating element 19 from under the ground and so as not to have wires leading to the top of the watering device 10 which could possibly be interferred with by animals drinking from the watering device 10.

In operation of the preferred embodiment of FIGS. 1-4, it is noted that the source of heat 19 is on one side of the water supply pipe 15 immediately adjacent chamber 30. Consequently, the right side portion 30 of the water supply pipe 15 as seen in FIG. 2 has a greater concentration of heat, and the portion 31 on the left side of member 18 as seen in FIGS. 2 and 3 is colder than the water on the other side thereof. Consequently, the water in the portion 30 is rising because it is heated and the water in the portion 31 is descending because it is cooler, thereby causing a circulation around the baffle member 18 as is clearly shown in FIG. 2. This, therefore, causes the heat from the heating element 19 to be evenly distributed in the water supply pipe 15 rather than to be concentrated near the top end thereof. Accordingly, it can be seen that the addition of the baffle member 18 does indeed accomplish all of the objects set forth above.

Obviously, many modifications and variations of the present invention are possible in light of the above teachings. It is therefore to be understood that, within the scope of the appended claim, the invention may be practiced otherwise than as specifically described.

I claim:

1. In an animal watering device of a type having an exterior housing; a water supply pipe disposed in said housing, a heating element disposed within said housing immediately adjacent to, and in heat exchange relationship with, one side of said water supply pipe for heating the water within said pipe; animal watering means connected to said housing and to said water supply pipe for allowing animals to obtain water therefrom, said supply pipe extending from a point below the frost level of the ground to an above ground point adjacent said animal watering means; thermal insulation means within said housing and surrounding said water supply pipe and said heating element; the improvement comprising:

means for causing circulation of water within said water supply pipe between said points including a circuitous passageway disposed within said water supply pipe, said circulation means including an open ended tubular member disposed within said supply pipe and extending from said first point below the frost line to said second point adjacent said animal watering means, said tubular member including a pair of spaced apart ribs extending externally along the length of said tubular member, said ribs being in sealing contact with the interior of the water supply pipe at said one side thereof to form a passageway between said ribs, the interior surface of the supply pipe immediately adjacent to said heating means and the exterior surface of the tubular member between said ribs whereby water in said passageway will be heated substantially more than the water within said tubular member thereby causing circulation of the water in said supply pipe by causing the hotter water in said passageway to constantly rise and the cooler water in the tubular member to constantly fall.

* * * * *